Feb. 6, 1940. W. HAMMER 2,189,002
QUICK RELEASING CHUCK
Filed July 27, 1937 2 Sheets-Sheet 1
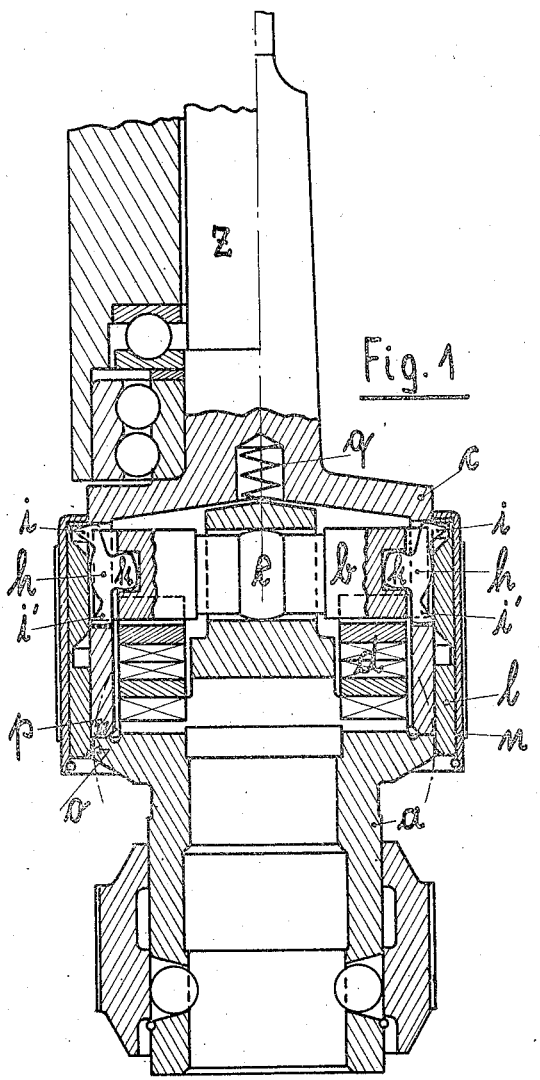
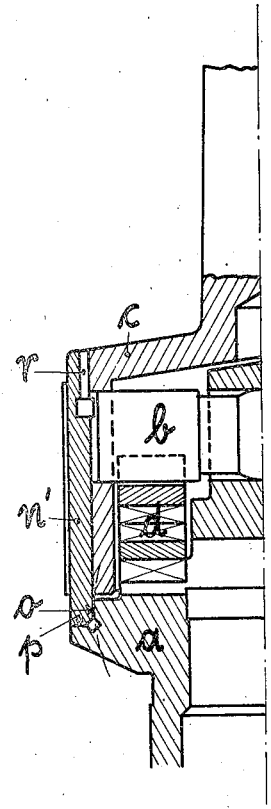
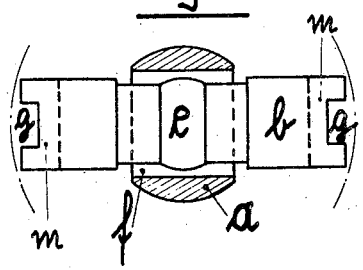

Feb. 6, 1940. W. HAMMER 2,189,002
QUICK RELEASING CHUCK
Filed July 27, 1937  2 Sheets-Sheet 2
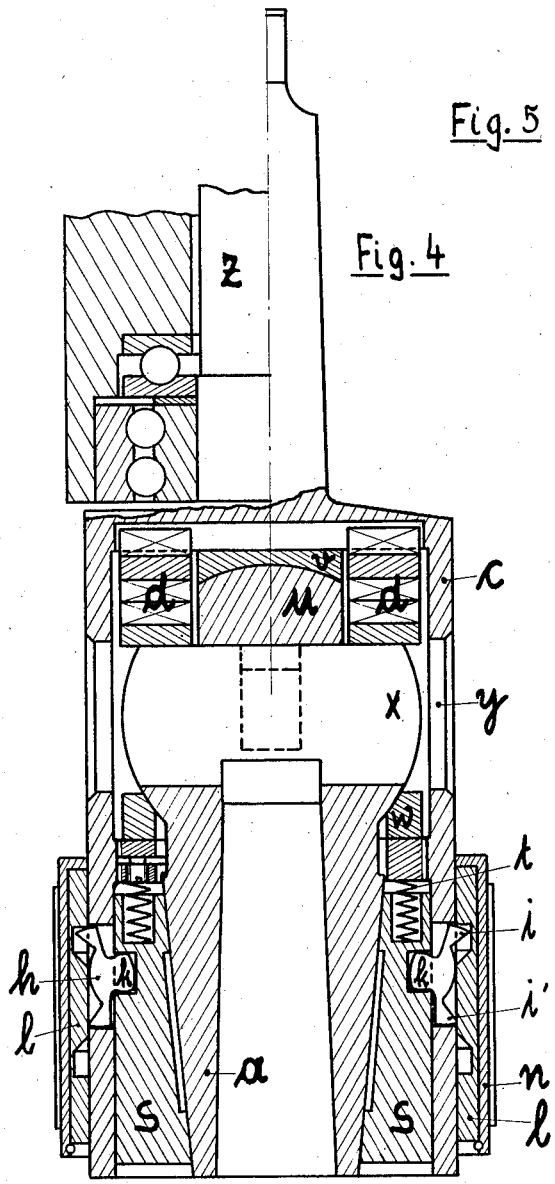
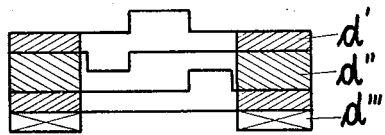
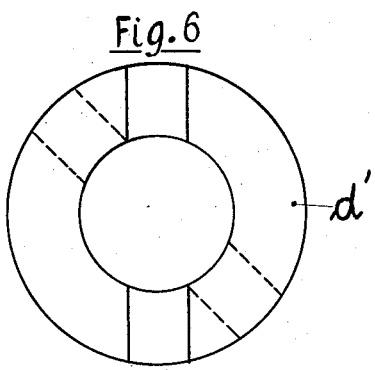
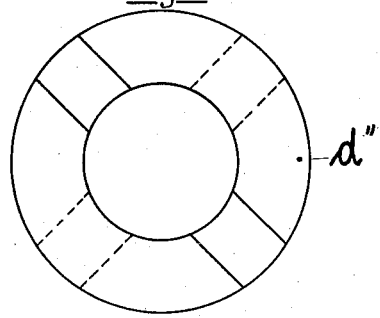
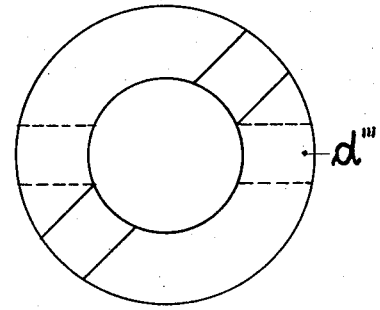

Patented Feb. 6, 1940

2,189,002

UNITED STATES PATENT OFFICE 2,189,002

QUICK RELEASING CHUCK

Wilhelm Hammer, Augsburg, Germany

Application July 27, 1937, Serial No. 155,990
In Germany August 4, 1936

4 Claims. (Cl. 279—16)

The object of the invention is, to construct a quick releasing chuck or any other chuck, the tool holder of which can carry out a pendulum movement and is besides freely adjustable relative to the axis so that it can be employed also as fixed quick releasing or other chuck and consequently remain permanently connected with the boring spindle.

The quick releasing chucks of known type are preferably employed for boring work for the rapid exchanging of the different tools, whilst the boring spindle is running. They must, however, be exchanged against pendulum chucks for reaming a bore or cutting a screw thread, when it is necessary for the tool to float freely.

The construction according to this invention makes this exchanging unnecessary, and it is based thereon, that the pendulum tool holder, shiftable in direction relative to the axis can be mechanically, electro-magnetically, hydraulically or pneumatically centred and secured in its position during work.

The device for centering consists, according to the invention, of a cylindrical centering sleeve and of a plane face of the tool holder on the one hand, and of a plane face of the chuck shaft on the other hand.

According to another embodiment of the invention the device for centering consists of a sleeve with internal cone centrally guided in the chuck shaft and which, after actuation of the locking device, bears against the outer conical surface of the tool holder.

The clamping device consists, according to the invention, of a rocker lever arrangement to be actuated by the shifting in axial direction of an outer sleeve, said rocker lever arrangement being located in the wall of the chuck shaft, and the cam-shaped heads of this rocker lever arrangement shift in axial direction a connecting member carrying the tool holder, so that it can oscillate and shift relative to the axis, until the collar-like plane surface of the tool holder abuts against the end face of the chuck shaft, whereas an inner or centering sleeve, easily turnable in the outer sleeve, is pushed at the same time over the centering portion of the tool holder, the connecting element being at the same time pressed upon the lower side of the wall of a bore in the chuck shaft when it is in the oscillating detached position.

By the same rocker lever arrangement the conical centering sleeve, employed according to another construction, can be shifted relative to the conical tool holder and pressed against the same.

The outer sleeve can be actuated by screw thread or electromagnetically, hydraulically or pneumatically.

In further development of the invention a chuck according to the invention, to save valuable space in the lifting height of boring machines, forms directly the spindle nose of boring machines, in that the spindle nose forms the housing for the chuck and the shaft of the boring machine forms the chuck shaft.

For the free adjusting of the tool holder in axial direction a disc clutch with mutually displaced diagonal engaging members of known type is employed. This disc clutch possesses, however, the inconvenience that it engages only in a certain angular position, i. e. at 45°, and exerts an unfavorable effect during the operation of the chuck as well as during the centering and locking of the same.

According to a further feature of the invention it is therefore proposed, to employ a multiple disc clutch, comprising three or more discs (mutually displaced by 45°) so that the angle of rotation of the superposed coupling discs is reduced from 45° to 22° 30'.

For the same purpose, i. e. to obviate engagement during the centering of the tool holder the centering portion of the tool-holder can be made spherical.

Three embodiments of the invention are illustrated, by way of example in the accompanying drawings in which:

Fig. 1 is a section through a quick releasing chuck, constructed at the left side as spindle nose, at the right side as chuck.

Fig. 2 is a top plan view on the connecting element.

Fig. 3 shows in section an outer sleeve with screw thread.

Fig. 4 shows in section a conical chuck, constructed at the left as spindle nose and at the right as insertable chuck.

Fig. 5 shows the multiple disc clutch.

Figs. 6, 7 and 8 are plan views each showing one of the discs of the multiple disc clutch illustrated in Fig. 5.

The tool holder $a$ is oscillatably suspended on a connecting element $b$. The positive connection from chuck shaft $c$ to the tool holder $a$ is effected by a disc clutch $d$ consisting of three clutch discs $d'$, $d''$ and $d'''$ the diametrical engaging members of which are mutually displaced by 45°. This clutch in combination with a spherical enlargement $e$ of the connecting element $b$ permits of a perfect and easy shifting of the axis in any angle of rotation. The spherical enlargement e of the connecting element has clearance in a rectangular bore f of the tool holder a perpendicularly to the axis. The ends of the connecting element b located in the rectangular apertures in the casing-like chuck shaft c engage in an upper clutch disc. Rocker levers h are located in recesses g in the ends of the connecting element b. Each of these rocker levers has a cam-shaped head k engaging in a groove m or n extending at right angles to each recess g and arms i and i' bearing against the inner wall of a centring sleeve l. The rocker levers h are thus enclosed on all sides so that they can only oscillate but not shift, their cam-shaped heads k effecting the lifting and lowering of the connecting element b and tool holder a.

The oscillating of the rocker levers h is caused by the lifting curves in the centering sleeve l mounted in the outer sleeve n in such a manner that it can easily turn.

The operation is as follows:

If the chuck has to be locked for boring, the outer sleeve n is first gripped and then pulled down. The lower end of the centering sleeve l continues to turn if pushed over the centering portion o of the tool holder a, and this tool holder itself is drawn by the heads k of the rocker levers h so that its collar-like plane surface p abuts against the end face of the chuck shaft c.

When the outer sleeve n is pushed upwards, the tool holder a is detached from the plane face p and the centering portion o is liberated by the centering sleeve l.

The arms i, i' of the two rocker levers cooperate with the centering sleeve l in such a manner that, when the outer sleeve n is pulled down, the lower arm i' presses tension against the centering sleeve l, the upper arm i having clearence, so that the chuck preserves its position in the clamped condition.

If the outer sleeve n is pushed upwards, the connecting element b bears against the lower edge of the apertures in the chuck shaft c and is to be securely held in this position by the tension of the upper arms i of the rocker levers h, whereas the lower arms i' of the same have clearance. The tool holder a is thereby maintained in its floating position without axial clearance, this being especially important for thread cutting. The connecting element b is loaded by a spring q in order to ensure that the floating position be preserved.

The length of the connecting element b corresponds to the internal diameter of the centering sleeve l. It is, however, proposed, to make the connecting element slightly shorter so that it can shift in transverse direction. Herefrom the advantage would result, that both rocker levers h, adjusting and balancing themselves, enter simultaneously into operation even if their dimensions are different.

In order that the rocker levers can be re-adjusted when worn, their cam-shaped heads k can abut against freely adjustable screw-threaded pins. In this instance the bearing faces of the rocker levers h must be re-ground accordingly.

As, during the centering the outer sleeve n is at first pushed over the centering sleeve l of the tool holder a and the plane surface p bears, only at the last moment, against the end face of the chuck shaft c in order to axially adjust, a clamping effect may occur, if the axis of the tool holder a is in oblique position. For this reason this tool holder a must have an arcuate centering portion o.

According to another form of construction the outer sleeve n can be screwed down by means of screw thread r on the chuck shaft c, for instance by securely holding, if the spindle rotates in anticlockwise direction, so that it can be screwed down over the centering portion o onto the plane surface p of the tool holder a.

In a third form of construction shown in Fig. 4 the tool holder is equipped with a normal tool cone instead of being designed for receiving a quick releasing chuck bush. This construction is destined for those cases, when a quick releasing chuck is not desirable, and if it is necessary to carry out work rigidly and floating or axially shiftable. In this instance a sleeve s, cylindrical on the outer side, situated on and having a chuck shaft o and having a tapering bore is pulled by the same action of the two rocker levers h against the tool holder a which is conical on the outer side. In order to maintain in this form of construction the chuck in the floating condition, springs t are inserted in the centering sleeve s.

The tool holder c has in this form of construction at its top end a spherical enlargement u which is oscillatably and shiftably mounted relatively to the axis in ball cups v, w. The spherical enlargement u carries the clutch and has a slot x for the tool cone, the chuck shaft having suitable apertures y for the access to this slot.

In order to save valuable space for the stroke of boring machines limited per se and to avoid the necessity of separate insertable chucks for the spindles of boring machines which are now-a-days rigid, the spindle nose of boring machines has to be constructed already as a floating chuck shiftable relatively to the axis and adapted to be secured in the central direction of the spindle in accordance with the one or other of the forms of construction described and illustrated.

With this object in view the third form of construction (Fig. 4) has been proposed especially with preservation of the usual tool cones. In this and the preceding instances the spindle head forms the housing c for the chuck, whereas the chuck shaft itself merges into the shaft z of the boring machine instead of merging into a tool cone.

The fixation of a floating chuck by rocker levers as described and shown, presents the advantage that the longer movement for shifting a sleeve over the centering portion of the tool holder has no effect on the sleeve, the shorter movement for pressing the plane face of the tool holder against the end face of the chuck shaft being utilized for the exertion of positive very rigid connection through the intermediary of the rocker levers.

This construction also presents the advantage that the boring pressure is taken up directly from the chuck shaft, the tool holder being locked.

The actuation of the connecting element or of the outer sleeve respectively might also be effected by an armature located in the bored shaft of the boring machine and electro-magnetically controlled from a distance on the upper end of the shaft.

Instead of the electric lifting device a hydraulic or pneumatic pulling device may be substituted for the armature.

I claim:

1. A quick releasing chuck especially for boring tools, comprising in combination a chuck shaft, a housing formed on the end of said shaft, a tool holder oscillatable and whose axis is shiftable in said housing, means in said housing for positively transmitting rotation from said shaft to said holder, means shiftable axially relatively to said housing for centering said tool holder, said centering means comprising an arcuate portion and a plane face on the tool holder on the one hand and a cylindrical sleeve and the outer end face of the housing on the other hand, and means for locking said holder while the shaft is rotating.

2. A quick releasing chuck especially for boring tools, comprising in combination a chuck shaft, a housing formed on the end of said shaft, and having opposite apertures, a tool holder oscillatable and whose axis is shiftable in said housing, means in said housing for positively transmitting rotation from said shaft to said holder, means shiftable axially relatively to said housing for centering said tool holder, and means for locking said holder while the shaft is rotating, said locking means comprising an arrangement of rocker levers one lever accommodated in each of said apertures, a transverse connecting element extending at its ends into said apertures and oscillatably carrying the tool holder, said element having recesses one at each end, cam-shaped heads one formed on each of said levers and oscillatably engaging one of said recesses, a centering sleeve axially shiftable on the outer side of said housing and bearing against the ends of said levers, said sleeve having recesses to allow the oscillation of said levers on their heads, and an outer sleeve rotatably enclosing said centering sleeve and axially shiftable on said housing to move said centering sleeve, axially shift said tool holder and rock said levers into and out of locking position.

3. A quick releasing chuck especially for boring tools, comprising in combination a chuck shaft, a housing formed on the end of said shaft, and having opposite apertures, a tool holder oscillatable and whose axis is shiftable in said housing, means in said housing for positively transmitting rotation from said shaft to said holder, means shiftable axially relatively to said housing for centering said tool holder, and means for locking said holder while the shaft is rotating, said locking means comprising an arrangement of rocker levers one lever accommodated in each of said apertures, a transverse connecting element extending at its ends into said apertures and oscillatably carrying the tool holder, said element having recesses one at each end, cam-shaped heads one formed on each of said levers and oscillatably engaging one of said recesses, a centering sleeve axially shiftable on the outer side of said housing and bearing against the ends of said levers, said sleeve having recesses to allow the oscillation of said levers on their heads, said levers having bevelled end faces and said recesses having a corresponding bevelled wall, and an outer sleeve rotatably enclosing said centering sleeve and axially shiftable on said housing to move said centering sleeve, axially shift said tool holder and rock said levers into and out of locking position.

4. A quick releasing chuck especially for boring tools, comprising in combination a chuck shaft, a housing formed on said shaft, a connecting element in said housing, a spherical enlargement formed in the middle of said connecting element, a tool holder having a rectangular bore at its upper end accommodating said connecting element and of a height corresponding to the diameter of said spherical enlargement to allow oscillation of said holder on said connection and of a width greater than the diameter of the spherical enlargement to allow displacement of the axis of said holder, means in said housing for positively transmitting rotation from said shaft to said holder, means shiftable axially relatively to said housing for centering said tool holder, and means for locking said holder while the shaft is rotating.

WILHELM HAMMER.